United States Patent
Muraji (10) Patent No.: US 7,011,053 B2
(45) Date of Patent: Mar. 14, 2006

(54) CONTROLLER FOR CONTROLLING OPENING AND CLOSING OF AN INTAKE VALVE OF AN ENGINE

(75) Inventor: Tetsuo Muraji, Odawara (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 10/398,182

(22) PCT Filed: Sep. 28, 2001

(86) PCT No.: PCT/JP01/08631

§ 371 (c)(1),
(2), (4) Date: Apr. 2, 2003

(87) PCT Pub. No.: WO02/29227

PCT Pub. Date: Apr. 11, 2002

(65) Prior Publication Data

US 2004/0031455 A1   Feb. 19, 2004

(30) Foreign Application Priority Data

Oct. 2, 2000   (JP) ................. 2000-302596

(51) Int. Cl.
   *F01L 9/04*   (2006.01)
(52) U.S. Cl. .................. 123/90.11; 251/129.01
(58) Field of Classification Search ............. 123/90.11; 251/129.01, 129.02, 129.04, 129.05
See application file for complete search history.

(56) References Cited

U.S. PATENT DOCUMENTS

| | | | | |
|---|---|---|---|---|
| 4,945,269 A | * | 7/1990 | Kamm | 310/15 |
| 5,596,956 A | | 1/1997 | Ogawa et al. | |
| 5,687,694 A | * | 11/1997 | Kanno | 123/479 |
| 5,791,305 A | | 8/1998 | Kather et al. | |
| 5,797,360 A | * | 8/1998 | Pischinger et al. | 123/90.11 |
| 5,889,405 A | | 3/1999 | Yannai et al. | |
| 6,176,208 B1 | | 1/2001 | Tsuzuki et al. | |
| 6,308,667 B1 | * | 10/2001 | Tsai et al. | 123/90.11 |
| 6,396,165 B1 | * | 5/2002 | Nagano et al. | 307/10.6 |
| 6,401,684 B1 | * | 6/2002 | Hori et al. | 123/198 F |
| 6,412,455 B1 | * | 7/2002 | Ogiso et al. | 123/90.11 |
| 6,457,353 B1 | * | 10/2002 | Kanke et al. | 73/117.3 |
| 6,574,545 B1 | * | 6/2003 | Hartke et al. | 701/107 |
| 2001/0003971 A1 | | 6/2001 | Hori et al. | |

FOREIGN PATENT DOCUMENTS

AU   6001699   5/2000

(Continued)

Primary Examiner—Thomas Denion
Assistant Examiner—Ching Chang
(74) Attorney, Agent, or Firm—Wenderoth, Lind & Ponack, L.L.P.

(57) ABSTRACT

A controller supplies a predetermined constant current as a drive current to an electromagnetic actuator in response to detection of a non-normal state including an abnormal signal system and an abnormal engine start state, and a force that keeps an intake valve of an engine is appropriately controlled with this drive current. As a result, engine start characteristics are improved and an engine operation is maintained even when the signal system is abnormal.

22 Claims, 7 Drawing Sheets

FOREIGN PATENT DOCUMENTS

| | | |
|---|---|---|
| EP | 0 717 172 | 6/1996 |
| EP | 810350 | 12/1997 |
| EP | 1045116 | 10/2000 |
| EP | 1 111 202 | 6/2001 |
| JP | 8-200135 | 8/1996 |
| JP | 9-195736 | 7/1997 |
| JP | 9-217613 | 8/1997 |
| JP | 9-217859 | 8/1997 |
| JP | 9-317419 | 12/1997 |
| JP | 11-81940 | 3/1999 |
| JP | 11-132017 | 5/1999 |
| JP | 2000-73791 | 3/2000 |
| JP | 2000-161124 | 6/2000 |
| JP | 2000-199411 | 7/2000 |
| WO | 00/26510 | 5/2000 |

\* cited by examiner

RELATIONSHIP BETWEEN PRESSURE IN COMBUSTION CHAMBER AND
FLOW VELOCITY IN INTAKE PORT
(ENGINE ROTATIONAL SPEED: 2000rpm, CONSTANT CURRENT: ZERO[A])

FIG.6

RELATIONSHIP BETWEEN PRESSURE IN COMBUSTION CHAMBER AND FLOW VELOCITY IN INTAKE PORT
(ENGINE ROTATIONAL SPEED: 2000rpm, SUPPLY CONSTANT CURRENT: 1.5[A])

CONTROLLER FOR CONTROLLING OPENING AND CLOSING OF AN INTAKE VALVE OF AN ENGINE

TECHNICAL FIELD

The present invention relates to a controller for controlling opening and closing of an intake valve of an engine and having an electromagnetic actuator.

BACKGROUND ART

Japanese Patent Application Laid-Open No. 9-217613, for example, discloses a controller that controls an opening and closing operation of an intake valve of an engine. This controller employs an electromagnetic actuator and adjusts a current supplied to the electromagnetic actuator according to an operating state of the engine so as to perform the control. This controller also comprises, for example, an engine parameter detection sensor, an arithmetic operation circuit for calculating a current supplied to the electromagnetic actuator based on an engine parameter and designating a current value to be supplied, and a drive circuit for driving the electromagnetic actuator according to the designated current value to be supplied.

In the above-mentioned conventional technology, engine speed data obtained from, for example, a crank angle sensor may have an abnormally large value due to an influence of noise. Further, when the arithmetic operation circuit is composed of a microcomputer, an error signal indicating an error of the microcomputer itself may be issued. Further, when a magnetic sensor is disposed in the electromagnetic actuator, an abnormal signal may be issued from the magnetic sensor.

When a so-called signal system including the sensor system and the arithmetic operation system is in an abnormal state, a problem arises in that opening and closing of the intake valve is not appropriately controlled by the electromagnetic actuator. Further, timing at which the intake valve is opened and closed, lift amount thereof, and the like are set by a data map using an engine speed as a parameter. However, since engine speed (hereinafter, "engine speed") obtained when a crank angle changes at a very slow speed at the start up of the engine, and the like, is excessively low, there is a problem in that an appropriate map value cannot be obtained.

The present invention has been achieved in order to solve the above problems. It is an object of this invention to provide a controller for controlling opening and closing of an intake valve of an engine capable of maintaining an engine operation even when a signal system is abnormal or even when an engine speed is in a non-normal state.

DISCLOSURE OF THE INVENTION

The controller, for controlling opening and closing of an intake valve of an engine, according to one aspect of the present invention comprises an electromagnetic actuator having a movable element coupled with the intake valve; a setting circuit for obtaining engine parameter signals of the engine and setting a target opening current based on the engine parameter signals obtained; a drive circuit for driving the electromagnetic actuator according to the target opening current; a determination unit that determines whether the setting circuit is in an abnormal state; and a correction unit that sets the target opening current to a predetermined constant current as long as the determination by the determination unit indicates that the setting circuit is in the abnormal state.

The controller, for controlling opening and closing of an intake valve of an engine, according to another aspect of the present invention compreises an electromagnetic actuator having a movable element coupled with the intake valve; a setting circuit for obtaining engine parameter signals of the engine and setting a target opening current based on the engine parameter signals obtained; a drive circuit for driving the electromagnetic actuator according to the target opening current; a determination unit that determines whether the setting circuit is in an abnormal state or that the setting circuit is in a non-normal state when it is determined that an engine speed signal of the engine parameter signals exhibits an engine speed less than a prescribed rotational speed; and a correction unit that sets the target opening current to a predetermined constant current as long as the determination by the determination unit indicates that the setting circuit is in the non-normal state.

The controller, for controlling opening and closing of an intake valve of an engine, according to still another aspect of the present invention comprises an electromagnetic actuator having a movable element coupled with the intake valve; a setting circuit for obtaining engine parameter signals of the engine and setting a target opening current based on the engine parameter signals obtained; a drive circuit for driving the electromagnetic actuator according to the target opening current; a determination unit that determines that the setting circuit is in a non-normal state when an engine speed signal of the engine parameter signals exhibits an engine speed less than a prescribed rotational speed; and a correction unit that sets the target opening current to a predetermined constant current as long as the determination by the determination unit indicates that the setting circuit is in the abnormal state.

BEST MODE FOR CARRYING OUT THE INVENTION

Exemplary embodiments of a controller according to the present invention will be explained below with reference to the accompanying diagrams.

Figure 1:
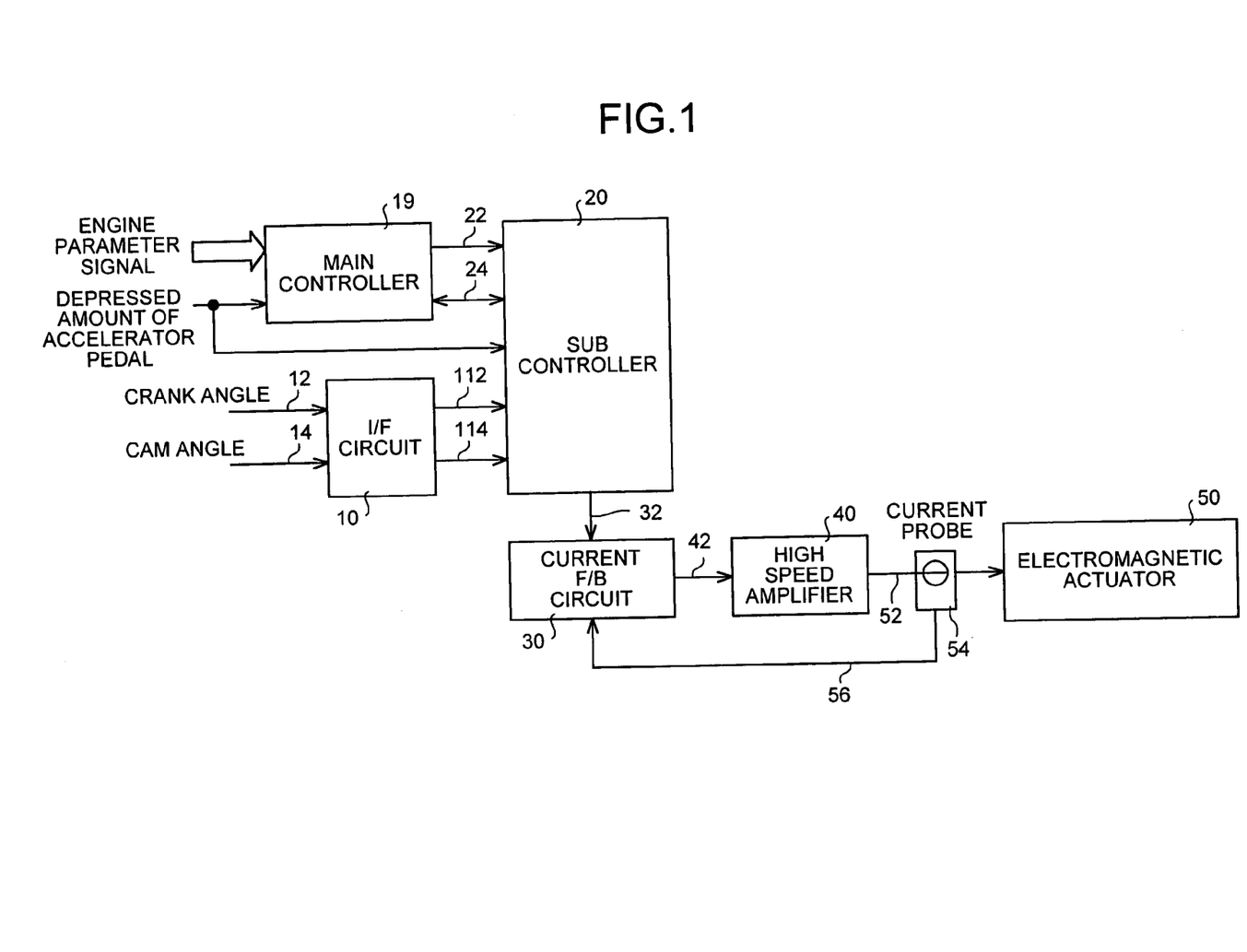
FIG. 1 is a block diagram of a controller for controlling opening and closing of an intake valve of an internal combustion engine according to the present invention.

A block diagram of one embodiment of a controller, which is used in the internal combustion engines, of the present invention is shown in FIG. 1. This controller comprises an interface (I/F) circuit 10 that receives a crank angle sensor signal 12 and a cam angle sensor signal 14 from the outside. For example, a crank angle sensor (not shown) and a cam angle sensor (not shown) disposed on a crankshaft of the internal combustion engine (not shown), which is mounted on a vehicle, detect the crank angle sensor signal 12 and the cam angle sensor signal 14 and suppy them to the interface circuit 10. The interface circuit 10 performs prescribed processing such as level conversion and the like with respect to the crank angle sensor signal 12 and the cam angle sensor signal 14 and outputs a crank angle signal 112 and a cam angle signal 114 to a subcontroller 20. The subcontroller 20 obtains an engine speed signal from the crank angle signal 112 or the cam angle signal 114. The engine speed signal is included in so-called engine parameters together with a throttle opening angle, a negative pressure of engine intake air, an amount of engine intake air, an engine temperature, and the like. In contrast, a target angle signal 22 set by a main controller 19 based on the engine parameters or a depressed amount of an accelerator pedal, is supplied to the subcontroller 20. The target opening signal 22 is a voltage signal having a voltage value between zero and five volts. Further, the subcontroller 20 transmits and receives a communication signal 24 such as a fault (error) signal, a correction signal, and the like to and from the main controller 19.

The subcontroller 20 supplies a target current signal 32 to a current feedback (F/B) circuit 30 based on the target opening signal 22, the crank angle signal 112, the cam angle signal 114, and the like. The target current signal 32 is a voltage signal having a voltage between zero and five volts. The current feedback circuit 30 supplies a command signal 42 to a high speed amplifier 40. The high speed amplifier 40 is an output amplifier having a rated current of, for example, four amperes. The high speed amplifier 40 supplies a drive current 52 to an electromagnetic actuator 50 via a current probe 54. When the current probe 54 detects tha drive current 52, it ouputs a detection signal 56 to the current feedback circuit 30. The current feedback circuit 30 adjusts the command signal 42 in such a manner that the difference between the command signal 42 and a target current shown by the drive current 52 and the target current signal 32 is reduced. An intake valve 310 (see FIG. 4) is coupled with a movable element (not shown) of the electromagnetic actuator 50. Note that the electromagnetic actuator 50 is of a so-called linear type in which a movement position approximately proportional to a supply current is given to the movable element and is similar to that disclosed in Japanese Patent Application Laid-Open No. 2000-199411.

Figure 2:
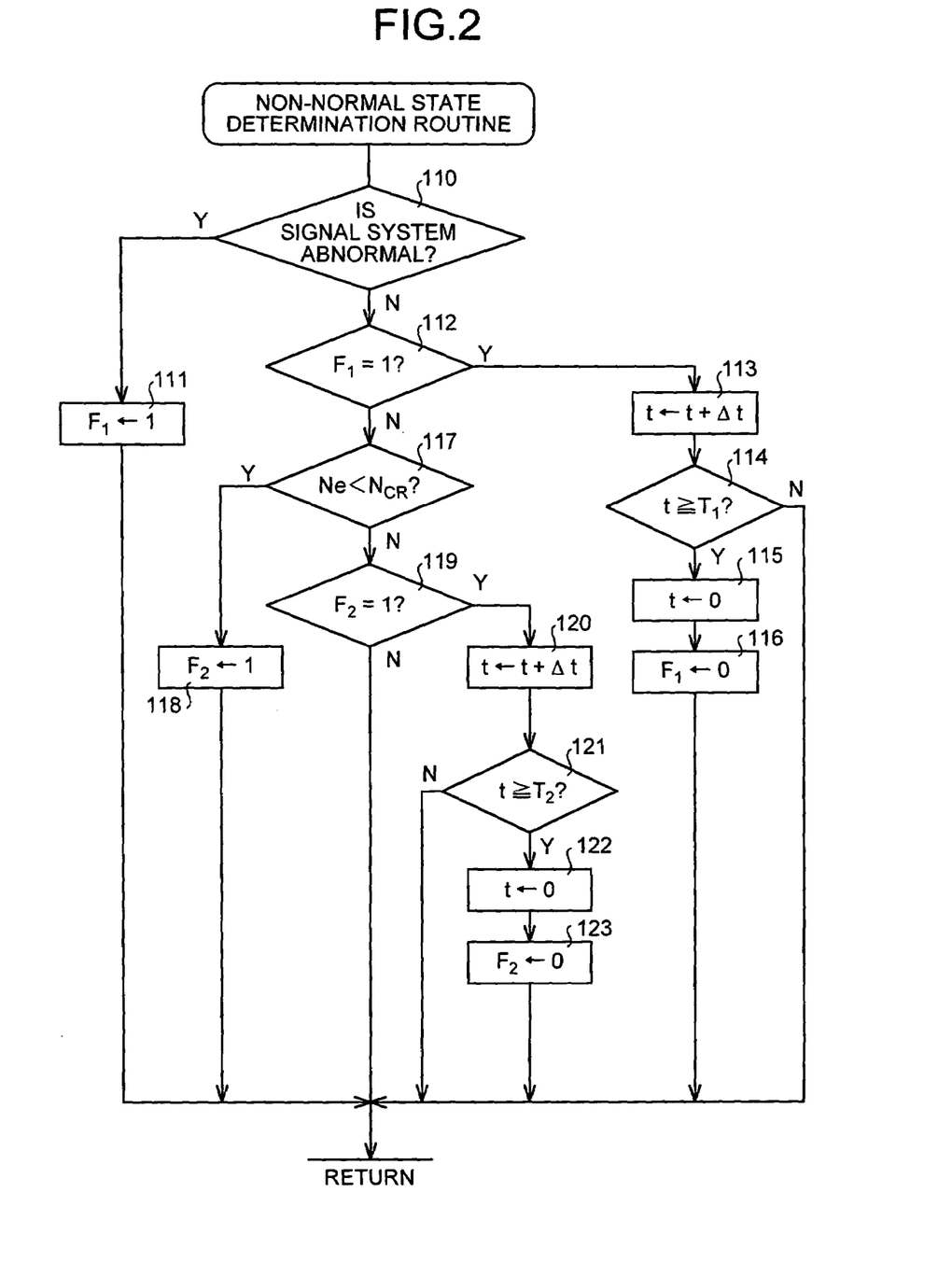
FIG. 2 is a flowchart that shows a non-normal state determination subroutine in the controller shown in FIG. 1.
Figure 3:
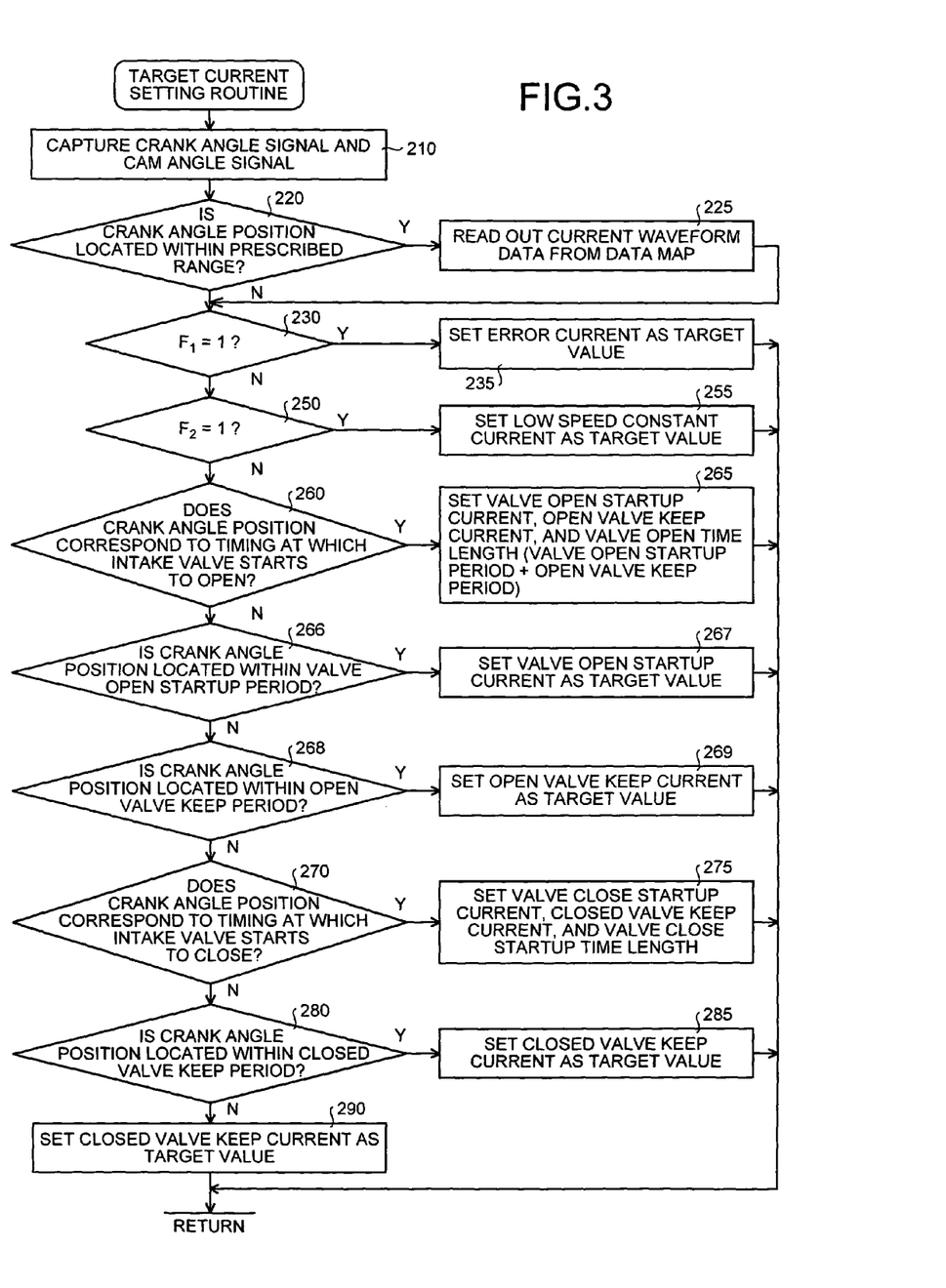
FIG. 3 is a flowchart that shows a target current setting routine executed in controller shown in FIG. 1.

FIG. 2 shows a non-normal state determination subroutine that creates a non-normal state determination flag used in a target current setting routine shown in FIG. 3. This subroutine is executed in the subcontroller 20 separately from the subroutine shown in FIG. 3. In this subroutine, first, it is detected at step 110 whether a signal system is abnormal. The signal system means a portion of the curcuitry from the current feedback circuit 30 to the electromagnetic actuator excluding an electric power system in FIG. 1. Further, when a magnetic sensor is disposed in the electromagnetic actuator to obtain the position information of the movable element, the magnetic sensor is also included in the signal system. If it is determined that the signal system is abnormal, a flag $F_1$ is initiated to "1" (step 111) and the the routine is terminatedterminated. If it is determined that the signal system is not abnormal, it is determined whether the flag $F_1$ has a value of "1" (step 112). If it is determined that the flag $F_1$ has a value of "1", a timer value t is incremented by Δ (step 113). At step 114 it is determined whether the resultant timer value t is greater than or equal to a time-over value $T_1$ (step 114). If it is determined that the timer value t is not greater than or equal to the time-over value $T_1$, the routine is terminated. In contrast, if it is determined that the timer value t is greater than or equal to the time-over value $T_1$, the timer value t is initialized to "0" (step 115), the flag $F_1$ is initiated to "0" (step 116), and the routine is terminated.

Incidentally, when it is determined at step 112 that the value of the flag $F_1$ is not equal to "1", it is determined whether engine speed data Ne represented by the engine speed signal is lower than a cranking rotational speed $N_{CR}$ at the start of the engine (step 117). If it is determined that the engine speed data Ne is lower than the cranking rotational speed $N_{CR}$ at the start of the engine, a flag $F_2$ is initialized to "1" (step 118), and the routine is terminated. In contrast, if it is determined at step 117 that the engine speed data Ne is higher than the cranking rotational speed $N_{CR}$ at the start of the engine, it is determined whether the value of the flag $F_2$ is "1" (step 119). If it is determined that the value of the flag $F_2$ is "1", the timer value t is incremented by Δ (step 120). At step 114 it is determined whether the resultant timer value t is greater than or equal to a time-over value $T_2$ (step 121). If it is determined that the timer value t is not greater than or equal to the time-over value, the routine is terminated. In contrast, if it is determined that the timer value t is greater than or equal to the time-over value, the timer value t is initialized to "0" (step 122), the flag $F_2$ is initiated to "0" (step 123), and the routine is terminated. Note that it is preferable to execute recovery from the determination of the error state after the determination of the engine start state is recovered by setting $T_1 > T_2$.

Accordingly, in this subroutine, the flag $F_1$ is set to "1" when the signal system is in the abnormal state, the flag $F_2$ is set to "1" when the engine speed data Ne is lower than the cranking rotational speed $N_{CR}$ at the start of the engine, and an error current or a low speed constant current is set as a target value in the target current setting routine which will be described later. Note that the abnormal state of the signal system unit, for example, a case in which the level of the crank angle signal 112 continuously keeps a maximum value or a minimum value or the magnitude or the change of the level thereof is in an abnormal state or a case in which the noise included in the crank angle signal is abnormally high. Further, when the detection sensor 19 and the subcontroller 20 are composed of microcomputers, an error signal is issued when the microcomputers fail. Thus, when the error signal is issued, it may be also determined that the signal system is in the abnormal state. Further, when the engine parameter signals other than the engine speed is abnormal, it may be also determined that the signal system is in the abnormal state. Further, when an output of the magnetic sensor in the electromagnetic actuator is abnormal, it may be also determined that the signal system is in the abnormal state. Further, not only the crank angle signal 112 but also the cam angle signal 114 may be used as the engine speed signal. Further, a case in which the engine speed signal is included in the engine parameter signals to the detection sensor 19, may be contemplated, and, in this case, it is not necessary to create the engine speed signal in the subcontroller 20.

FIG. 3 is a flowchart that shows the target current setting subroutine executed by controller shown in FIG. 1. This routine is executed in the subcontroller 20. First, the crank angle signal and the cam angle signal are captured (step 210). The engine speed data Ne is obtained in a different routine (not shown) using the crank angle signal and the cam angle signal. Next, it is determined whether a crank angle position data value obtained by the crank angle signal is within a prescribed crank angle range (step 220). When it is determined that a crank angle position is within the prescribed range, a current waveform data is read out from a data map preset in the subcontroller 20 (step 225). Next, it is determined whether $F_1$ described above is set to the value "1". When it is determined that $F_1$ =1, that is, when it is determined that the engine speed signal is not normal, a prescribed error current value is set as a target value (step 235), and the subroutine is finished at once. The target current signal 32 representing the target value is supplied to the current feedback circuit 30. When it is determined that the flag $F_1$=0, that is, the engine speed signal is not abnormal, it is determined whether $F_2$=1 (step 250). When it is determined that $F_2$=1, that is, the engine speed signal is lower than a prescribed low rotational speed, a prescribed low rotational speed constant current value is set as the target value (step 235), and the subroutine is finished at once. The target current signal 32 representing the target value is supplied to the current feedback circuit 30. When it is determined that $F_2 \neq 1$, that is, when the engine speed signal is not lower than the prescribed low rotational speed, an operation in a normal state is executed because the engine speed signal is normal. That is, it is determined whether a crank angle position corresponds to timing at which the intake valve starts to open (step 260). When it is determined that the crank angle position corresponds to the timing at which the intake valve starts to open, a valve open startup current, an open valve keep current, and a valve open time length (a sum of a valve open startup period and an open valve keep period) are set based on the current waveform data captured at step 225 (step 265), and the routine is terminated. At step 260, when it is determined that the crank angle position does not correspond to the timing at which the intake valve starts to open, it is determined whether the crank angle position is located within the valve open startup period (step 266). When it is determined that the crank angle position is located within the valve open startup period, the valve open startup current is set as the target value (step 267), and the routine is terminated. When the crank angle position is located outside of the valve open startup period, it is determined whether the crank angle position is located within the open valve keep period (step 268). When the crank angle position is located within the open valve keep period, the open valve keep current is set as the target value (step 269), and the process goes to next step 270. At step 270, it is determined whether the crank angle position corresponds to timing at which the intake valve starts to close. When it is determined that the crank angle position corresponds to the timing at which the intake valve starts to close, a valve close startup current, a closed valve keep current, and a valve close time length are set based on the current waveform data captured (step 275), and the routine is terminated. When it is determined that the crank angle position does not correspond to the timing at which the intake valve starts to close, it is determined whether the crank angle position is located within a closed valve keep period at step 280. When it is determined that the crank angle position is located within the closed valve keep period, the closed valve keep current is set as the target value (step 285), and the routine is terminated. When it is determined that the closed valve keep period is finished, the closed valve keep current is set as the target value (step 290), and the routine is terminated.

Note that the low speed constant current value may be adjusted according to an engine temperature. For example, the current is set to zero [A] when the engine is at a low temperature, and it is set to 3 [A] after the engine is warmed up. Further, when the accelerator pedal is not directly coupled with a throttle valve or when the engine does not include the throttle valve, the low speed constant current value may be adjusted according to the error current and the depressed amount of the accelerator pedal. The prescribed crank angle range at step 220 may be set to the crank angle range from, for example, the timing at which the intake valve is closed to the timing at which it starts to open.

Figure 4:
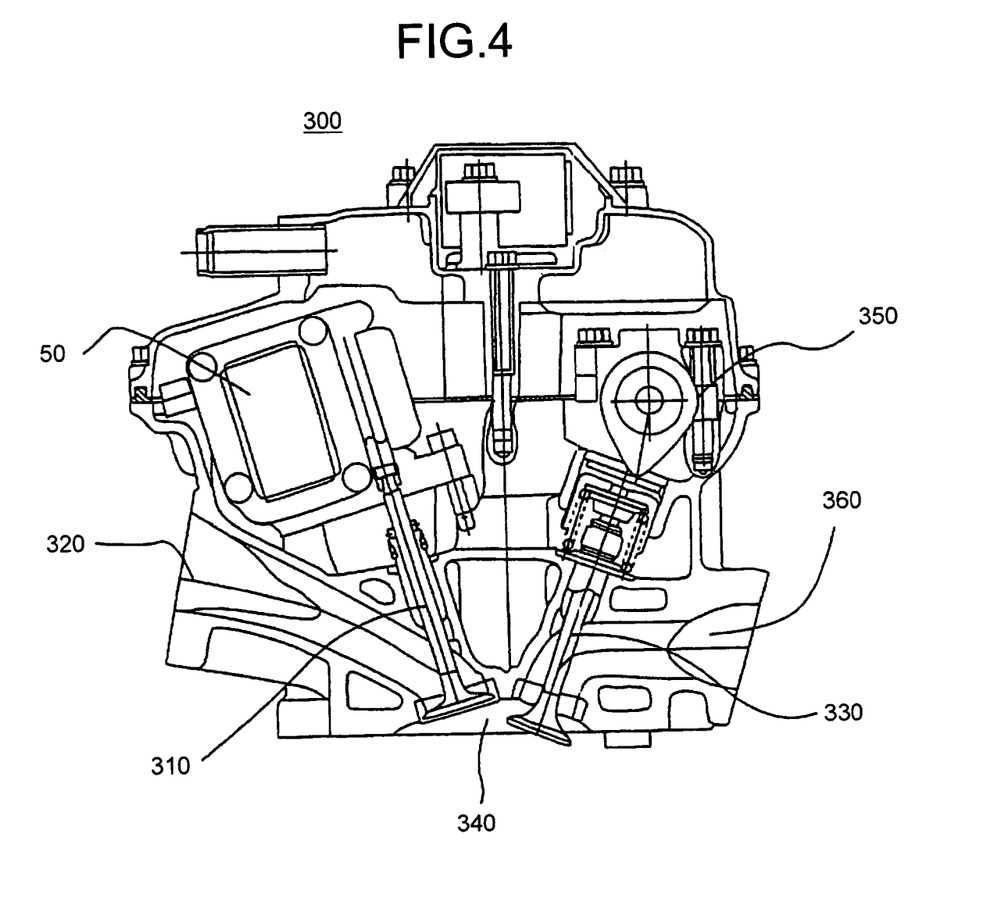
FIG. 4 is a partial longitudinal sectional view of the internal combustion engine controlled by controller shown in FIG. 1.

FIG. 4 is a partial longitudinal sectional view of the internal combustion engine 300 controlled by controller shown in FIG. 1. The electromagnetic actuator 50 is disposed above an intake port 320 of an engine head. The intake valve 310 is coupled with the movable element of the electromagnetic actuator 50.

In the engine 300 having the intake valve drive system arranged as described above, when a crank angle sensor system is normal and the engine is not in a low rotational speed state such as a startup state, the electromagnetic actuator is driven according to the target current set at step 260 and subsequent steps in the subroutine shown in FIG. 3.

When it is determined that the engine speed signal is in the non-normal state, the error current is set at step 235 and the low speed constant current is set at step 255. With this operation, when the engine 300 enters, for example, an intake stroke, a drive current at an normal time is not supplied to the electromagnetic actuator 50, but the error current or the low speed constant current that have been set are supplied thereto. Accordingly, a closed valve keeping force is applied to the intake valve 310 by the electromagnetic actuator 50. The closed valve keeping force is, for example, about 3 Kg. When the engine is in the intake stroke in this state, the intake valve 310 and an exhaust valve 330 are closed together. When a piston (not shown) starts to move downward, a negative pressure is generated in a combustion chamber 340. As the piston moves downward, the negative pressure in the combustion chamber 340 increases and acts to open the intake valve 310. When the force that intends to open the intake valve 310 exceeds the closed valve keeping force applied by the electromagnetic actuator 50, the intake valve 310 is opened. Since the intake valve is forcibly opened as the piston moves, even when the engine speed signal is not normal, the engine can be continuously operated.

Further, the closed valve keeping force to the intake valve 310 can be controlled by adjusting the error current value and the low speed constant current value, thereby the lift amount and the opening and closing timing of the intake valve 310 can be controlled. Accordingly, when, for example, the crank angle sensor fails while the vehicle travels at a high speed and a valve open current is set to the error voltage value by determining that the crank angle signal is not normal, the vehicle can travel on flat land at about 60 km/h regardless of that the crank angle sensor fails. Further, when it is desired to reduce the running speed, the drive current 52 to the electromagnetic actuator 50 is preferably adjusted by previously adjusting the error current value to increase a load to the intake valve in a valve close direction. Further, when the linear type electromagnetic actuator disclosed in Japanese Patent Application Laid-Open No. 2000-199411 is used as the electromagnetic actuator 50, the closed valve keeping force of, for example, 3 Kg can be obtained in a not driven state. Thus, it is possible to set the error current value and the low speed constant current value to zero [A] because the closed valve keeping force of, for example, about 3 Kg can be obtained in a not driven state. In other words, the electromagnetic actuator 50 preferably selects as its characteristics the error current value and the low speed constant current value such that a total closed valve keeping force, which is obtained by adding an additional closed valve keeping force obtained by the error current and the low speed constant current to the closed valve keeping force in the not driven state has a value corresponding to a desired engine operation. Note that since an operation for opening and closing the exhaust valve is executed by a well-known valve train, description of the operation principle of the valve is omitted.

Figure 5:
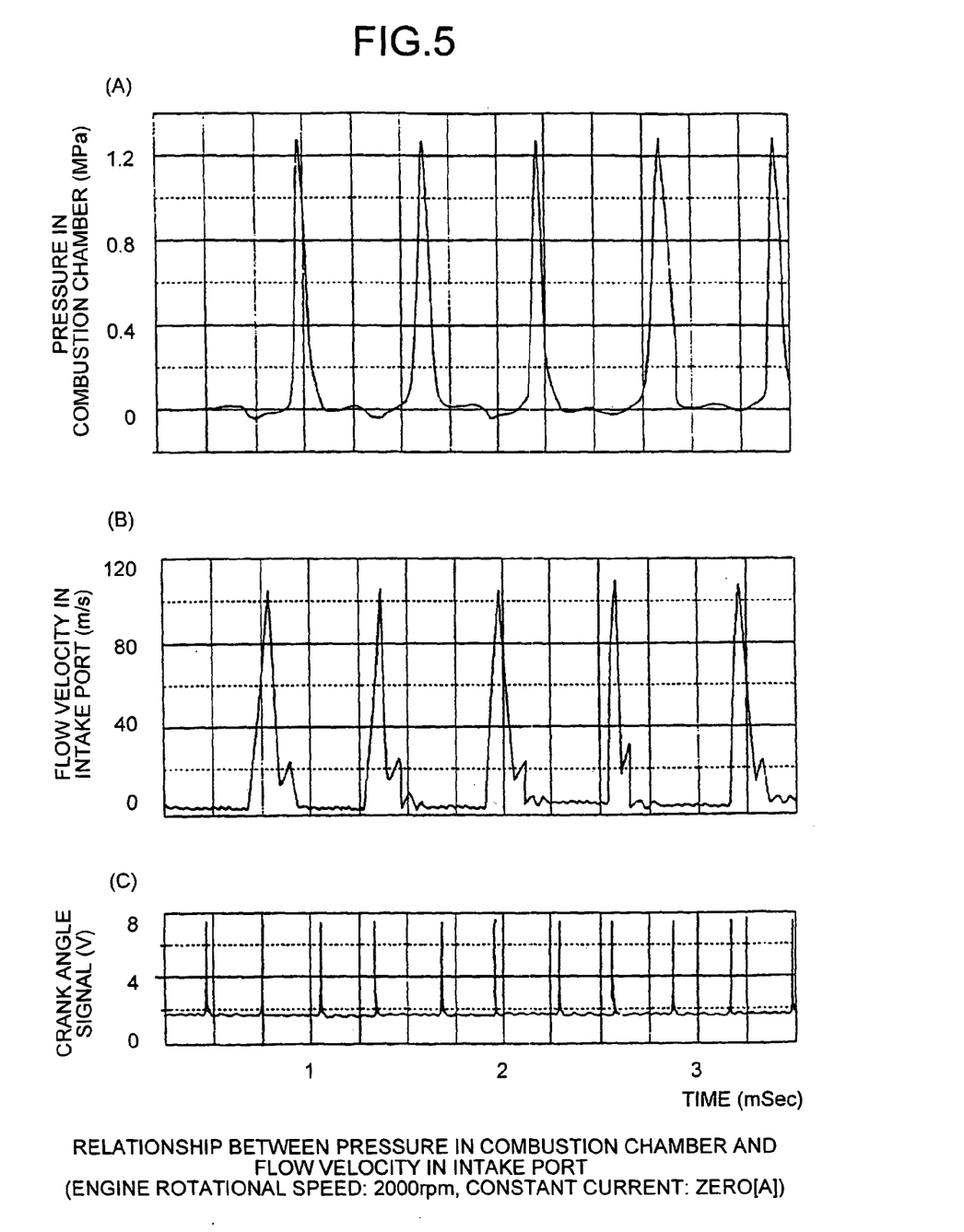
FIG. 5 includes graphs that show a change of a pressure in a combustion chamber and a change of a flow velocity in an intake port using an error current value to an electromagnetic actuator as a parameter when the internal combustion engine is operated at a prescribed rotational speed.
Figure 6:
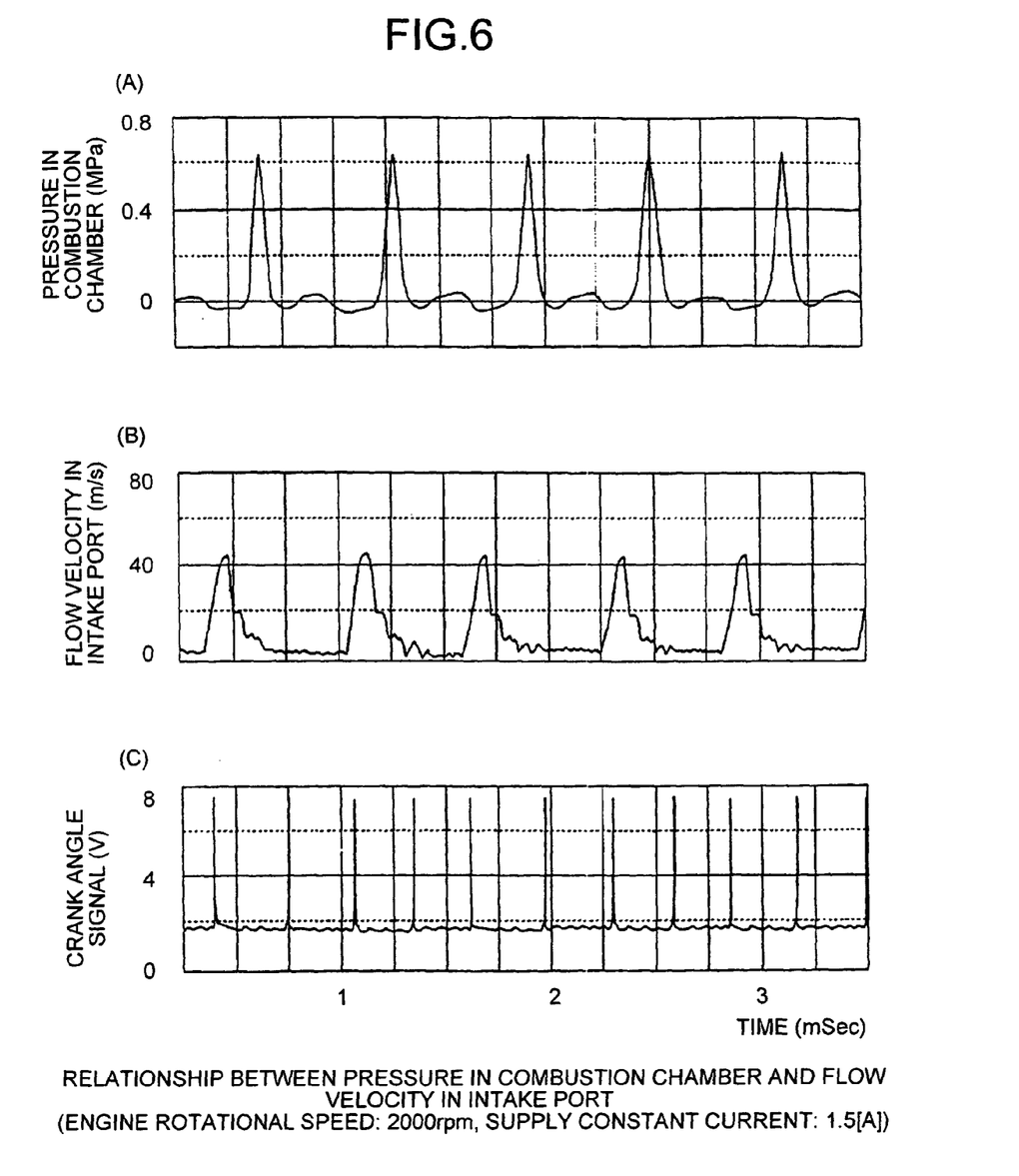
FIG. 6 includes graphs that show a change of the pressure in the combustion chamber and a change of the flow velocity in the intake port using the error current value to the electromagnetic actuator as the parameter when the internal combustion engine is operated at the prescribed rotational speed.
Figure 7:
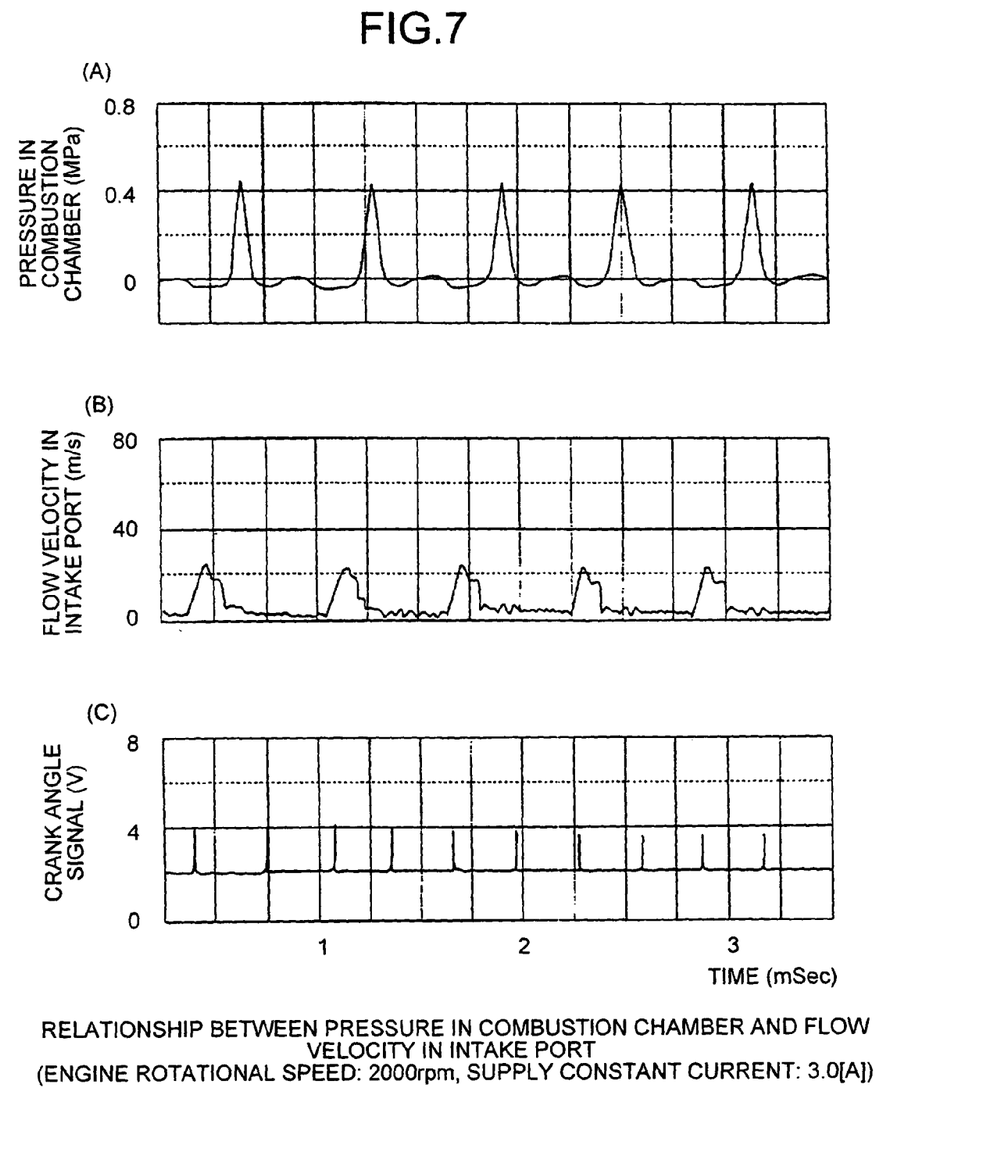
FIG. 7 includes graphs that show a change of the pressure in the combustion chamber and a change of the flow velocity in the intake port using the error current value to the electromagnetic actuator as the parameter when the internal combustion engine is operated at the prescribed rotational speed.

FIGS. 5, 6, and C include graphs that show the pressure in the combustion chamber of the internal combustion engine and the change of the flow velocity in the intake valve using the magnitude of the error current to the electromagnetic actuator as a parameter when the engine rotates constantly at 2000 rpm/min.

FIG. 5 shows the relationship between the pressure in the combustion chamber 340 and the flow velocity in the intake port 320 when the error current is set to zero [A]. The graph (C) shows the crank angle signal as an input to the subcontroller 20. As a result that the error current of zero [A] is supplied to the electromagnetic actuator 50, the intake valve 310 is opened by the negative pressure created by the piston when it moves downward in the intake stroke, and the intake port 320 obtains a maximum flow velocity of about 105 m/sec as shown in the graph (B). Further, as a result of the upward movement of the piston in a compression stroke, a maximum pressure of about 1.3 Mpa is obtained in the combustion chamber 340.

FIG. 6 shows the relationship between the pressure in the combustion chamber 340 and the flow velocity in the intake port 320 when the error current to the electromagnetic actuator 50 is set to 1.5 [A]. In the same manner as FIG. 5, the graphs in (A), (B), and (C) show the fluctuation of the pressure in the combustion chamber, the fluctuation of the flow velocity in the intake port, and the fluctuation of the crank angle signal, respectively, the intake port 320 obtains a maximum flow velocity of about 45 m/sec, and the combustion chamber 340 obtains a maximum pressure of about 0.6 Mpa.

FIG. 7 shows the relationship between the pressure in the combustion chamber 340 and the flow velocity in the intake port 320 when the error current to the electromagnetic actuator 50 is set to 3.0 [A]. In the same manner as FIGS. 5 and 6, the graphs in (A), (B), and (C) show the fluctuation of the pressure in the combustion chamber, the fluctuation of the flow velocity in the intake port, and the fluctuation of the crank angle signal, respectively, the intake port 320 obtains a maximum flow velocity of about 25 m/sec, and the combustion chamber 340 obtains a maximum pressure of about 0.45 Mpa.

From the graphs shown in FIGS. 5 and 6, it can be found that the closed valve keep force of the intake valve is changed by adjusting the error current to the electromagnetic actuator so that the magnitude of change of the pressure in the combustion chamber is varied. It is known that the magnitude of fluctuation of the pressure in the combustion chamber is proportional to an engine output. Accordingly, an engine output according a depressed amount of the accelerator pedal can be obtained by adjusting the error current according to, for example, the depressed amount of the accelerator pedal although the engine may not operate normally, which is preferable because a certain degree of drivability can be obtained.

INDUSTRIAL APPLICABILITY

As described above, in controller having the electromagnetic actuator according to the present invention, even when the signal system is in the abnormal state or the engine speed signal is in the non-normal state, the closed valve keep force of the intake valve is appropriately set, thereby the engine operation can be maintained.

The invention claimed is:

1. A controller for controlling opening and closing of an intake valve of an engine, the controller comprising:
   an electromagnetic actuator having a movable element coupled with the intake valve;
   a setting circuit for obtaining engine parameter signals of the engine and setting a target opening current based on the engine parameter signals obtained;
   a drive circuit for driving the electromagnetic actuator according to the target opening current;
   a determination unit operable to determine whether the setting circuit is in an abnormal state; and
   a correction unit operable to set the target opening current to a predetermined constant current as long as the determination by the determination unit indicates that the setting circuit is in the abnormal state,
   wherein the electromagnetic actuator generates a drive force approximately proportional to a magnitude of a drive current, and
   wherein the determination unit determines that the setting circuit is in the abnormal state when a magnitude of a level or a change of the level of an engine revolution number signal is abnormal.

2. The controller according to claim 1, wherein the setting circuit comprises a microcomputer and creates an error signal when the microcomputer itself fails, and the determination unit determines that the setting circuit is in the abnormal state when the microcomputer creates the error signal.

3. The controller according to claim 1, wherein the electromagnetic actuator comprises a magnetic sensor, and the determination unit determines that the setting circuit is in the abnormal state when an output from the magnetic sensor is abnormal.

4. The controller according to claim 1, wherein the correction unit adjusts a magnitude of the predetermined constant current according to an engine temperature signal of the engine parameter signals or a depressed amount of an accelerator pedal.

5. The controller according to claim 1, wherein the electromagnetic actuator applies a closed valve keep force to the intake valve in a not driven state.

6. A controller for controlling opening and closing of an intake valve of an engine, the controller comprising:
   an electromagnetic actuator having a movable element coupled with the intake valve;
   a setting circuit for obtaining engine parameter signals of the engine and setting a target opening current based on the engine parameter signals obtained;
   a drive circuit for driving the electromagnetic actuator according to the target opening current;

a determination unit operable to determine whether the setting circuit is in an abnormal state; and a correction unit operable to set the target opening current to a predetermined constant current as long as the determination by the determination unit indicates that the setting circuit is in the abnormal state, wherein the electromagnetic actuator generates a drive force approximately proportional to a magnitude of a drive current, and wherein the determination unit determines that the setting circuit is in the abnormal state when a noise level of an engine revolution number signal is larger than a predetermined level.

7. The controller according to claim 6, wherein the setting circuit comprises a microcomputer and creates an error signal when the microcomputer itself fails, and the determination unit determines that the setting circuit is in the abnormal state when the microcomputer creates the error signal.

8. The controller according to claim 6, wherein the electromagnetic actuator comprises a magnetic sensor, and the determination unit determines that the setting circuit is in the abnormal state when an output from the magnetic sensor is abnormal.

9. The controller according to claim 6, wherein the correction unit adjusts a magnitude of the predetermined constant current according to an engine temperature signal of the engine parameter signals or a depressed amount of an accelerator pedal.

10. The controller according to claim 6, wherein the electromagnetic actuator applies a closed valve keep force to the intake valve in a not driven state.

11. A controller for controlling opening and closing of an intake valve of an engine, the controller comprising:

an electromagnetic actuator having a movable element coupled with the intake valve;

a setting circuit for obtaining engine parameter signals of the engine and setting a target opening current based on the engine parameter signals obtained;

a drive circuit for driving the electromagnetic actuator according to the target opening current;

a determination unit operable to determine whether the setting circuit is in an abnormal state or whether there is a non-normal state in which an engine revolution number signal in the engine parameter signals exhibits an engine speed that is less than a prescribed rotational speed; and a correction unit operable to set the target opening current to a predetermined constant current as long as the determination by the determination twit indicates that the setting circuit is in the abnormal state or the non-normal state exists, wherein the electromagnetic actuator generates a drive force approximately proportional to a magnitude of a drive current, and wherein the determination unit determines that the setting circuit is in the abnormal state when a magnitude of a level or a change of the level of the engine revolution number signal is abnormal.

12. The controller according to claim 11, wherein the setting circuit comprises a microcomputer and creates an error signal when the microcomputer itself fails, and the determination unit determines that the setting circuit is in the abnormal state when the microcomputer creates the error signal.

13. The controller according to claim 11, wherein the electromagnetic actuator comprises a magnetic sensor, and the determination unit determines that the setting circuit is in the abnormal state when an output from the magnetic sensor is abnormal.

14. The controller according to claim 11, wherein the correction unit adjusts a magnitude of the predetermined constant current according to an engine temperature signal of the engine parameter signals or a depressed amount of an accelerator pedal.

15. The controller according to claim 11, wherein the electromagnetic actuator applies a closed valve keep force to the intake valve in a not driven state.

16. A controller for controlling opening and closing of an intake valve of an engine, the controller comprising:

an electromagnetic actuator having a movable element coupled with the intake valve;

a setting circuit for obtaining engine parameter signals of the engine and setting a target opening current based on the engine parameter signals obtained;

a drive circuit for driving the electromagnetic actuator according to the target opening current;

a determination unit operable to determine whether the setting circuit is in an abnormal state or whether there is a non-normal state in which an engine revolution number signal in the engine parameter signals exhibits an engine speed that is less than a prescribed rotational speed; and a correction unit operable to set the target opening current to a predetermined constant current as long as the determination by the determination unit indicates that the setting circuit is in the abnormal state or the non-normal state exists, wherein the electromagnetic actuator generates a drive force approximately proportional to a magnitude of a drive current, and wherein the determination unit determines that the setting circuit is in the abnormal state when a noise level of the engine revolution number signal is larger than a predetermined level.

17. The controller according to claim 16, wherein the setting circuit comprises a microcomputer and creates an error signal when the microcomputer itself fails, and the determination unit determines that the setting circuit is in the abnormal state when the microcomputer creates the error signal.

18. The controller according to claim 16, wherein the electromagnetic actuator comprises a magnetic sensor, and the determination unit determines that the setting circuit is in the abnormal state when an output from the magnetic sensor is abnormal.

19. The controller according to claim 16, wherein the correction unit adjusts a magnitude of the predetermined constant current according to an engine temperature signal or a depressed amount of an accelerator pedal.

20. A controller for controlling opening and closing of an intake valve of an engine, the controller comprising:

an electromagnetic actuator having a movable element coupled with the intake valve;

a setting circuit for obtaining engine parameter signals of the engine and setting a target opening current based on the engine parameter signals obtained;

a drive circuit for driving the electromagnetic actuator according to the target opening current;

a determination unit operable to determine whether there is a non-normal state in which an engine revolution number signal in the engine parameter signals exhibits an engine speed less than a prescribed rotational speed; and a correction unit operable to set the target opening current to a predetermined constant current as long as the determination by the determination unit indicates that the non-normal state exists, wherein the electromagnetic actuator generates a drive force approximately proportional to a magnitude of a drive current, and wherein the electromagnetic actuator comprises a magnetic sensor, and the determination unit determines that the setting circuit is in the non-normal state when an output from the magnetic sensor is abnormal.

21. The controller according to claim 20, wherein the correction unit adjusts a magnitude of the predetermined constant current according to an engine temperature signal of the engine parameter signals or a depressed amount of an accelerator pedal.

22. The controller according to claim 20, wherein the electromagnetic actuator applies a closed valve keep force to the intake valve in a not driven state.

* * * * *